United States Patent [19]

Bauer

[11] Patent Number: 4,887,520
[45] Date of Patent: Dec. 19, 1989

[54] AIR OUTLET DEVICE

[75] Inventor: Karl-Heinz Bauer, Bad Neustadt, Fed. Rep. of Germany

[73] Assignee: Preh, Elektrofeinmechanische Werke Jacob Preh, Nachf. GmbH & Co., Bad Neustadt, Fed. Rep. of Germany

[21] Appl. No.: 164,838

[22] Filed: Mar. 7, 1988

[30] Foreign Application Priority Data

Mar. 7, 1987 [DE] Fed. Rep. of Germany ....... 3707397

[51] Int. Cl.$^4$ .............................................. F24F 13/10
[52] U.S. Cl. .............................................. 98/2; 98/41.1
[58] Field of Search .................. 98/2, 40.02, 40.28, 98/41.1, 41.3; 251/300, 301

[56] References Cited

U.S. PATENT DOCUMENTS

| 310,107 | 12/1884 | Wilson et al. | 251/300 |
| 2,005,029 | 6/1935 | Field | 251/301 X |
| 2,134,143 | 10/1938 | Paget | 251/301 X |
| 2,302,645 | 11/1942 | Kalix | 251/301 |
| 3,861,281 | 1/1975 | Godwin | 98/2 |
| 4,610,196 | 9/1986 | Kern | 98/40.02 X |

FOREIGN PATENT DOCUMENTS

| 3333878 | 3/1985 | Fed. Rep. of Germany | 98/2 |
| 29045 | of 1911 | United Kingdom | 251/300 |

Primary Examiner—Harold Joyce
Attorney, Agent, or Firm—Wegner & Bretschneider

[57] ABSTRACT

In an air outlet device, a closure flap (9) is pivotably mounted in a housing body (1). The closure flap can be tilted in front of an air passage opening (3) by means of an actuating part (14). To avoid the closure flap (9), in its open position, taking up a considerable amount of space in the air exit shaft (4) and in order to keep the number of components required small, the closure flap (9) is of circular ring segment-shaped design in cross-section. The pivot axis of the closure flap (9) lies in the center point of the radius of the circular ring segment shape. The actuating part (14) is molded onto the closure flap (9).

7 Claims, 2 Drawing Sheets

Fig. 1
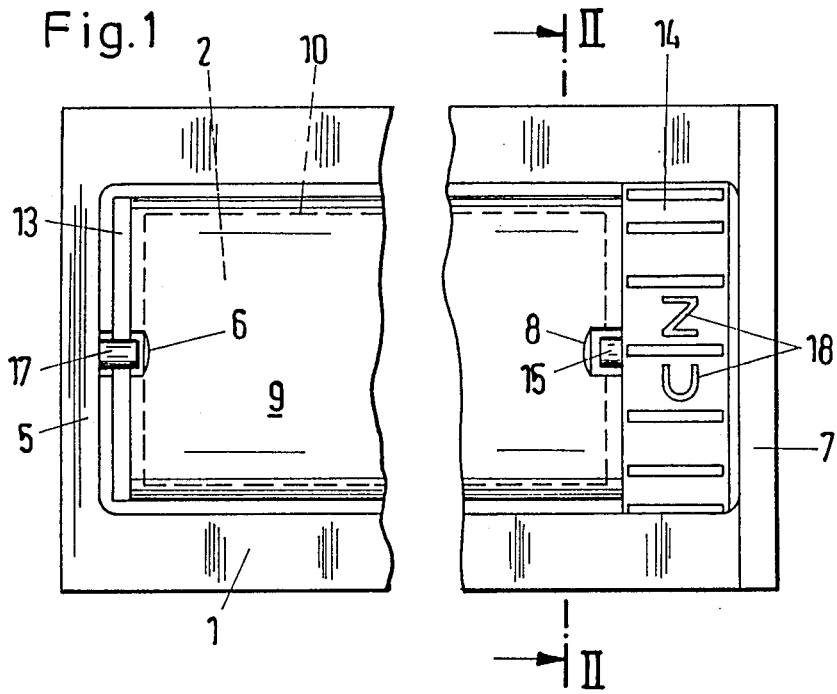
Fig. 2A
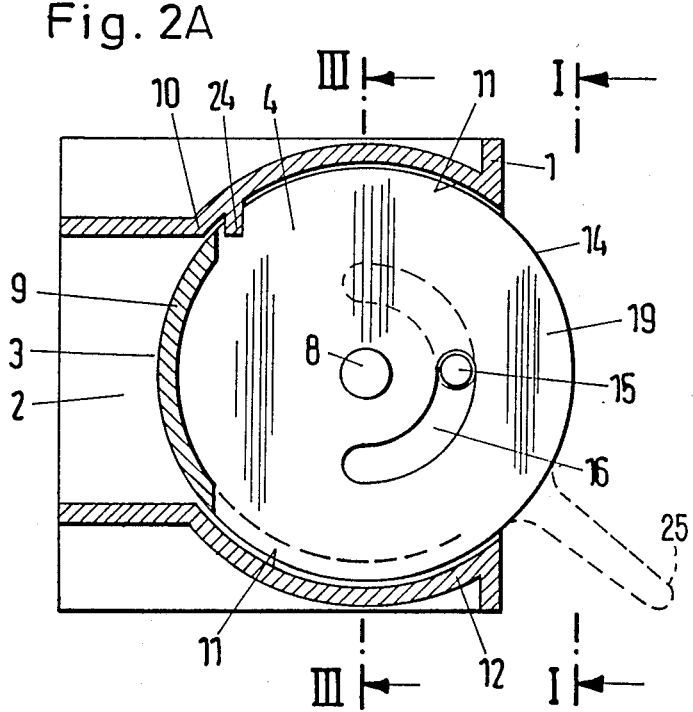
Fig. 2B

AIR OUTLET DEVICE

The invention relates to an air outlet device having a housing body and a closure flap pivotably mounted on the latter, which can be tilted about a pivot axis in front of an air passage opening of the housing body, closing said opening, by means of an actuating part.

Air outlet devices of this kind are, for example, used in motor vehicles. Their function is to adjust the supply of air to the passenger compartment of the vehicle.

German Utility Model DE-GM 8,535,924 describes a closure flap for an air outlet device of this kind. This closure flap is of essentially planar design. Its pivot axis extends in the region of its center. A construction of this kind requires a comparatively large constructional depth because a free space into which the closure flap can pivot in its open position must be provided in the housing body. In the case of German Utility Model DE-GM 8,535,924, the depth of the free space required corresponds to the length of the closure flap.

In known air outlet devices, the closure flap is actuated by the actuating part via a lever arrangement. The actuating part and the closure flap in this arrangement are mounted on separate bearing points. A construction of this kind results in a multiplicity of bearing points and individual parts. Assembly is also correspondingly complicated. In addition, special measures have to be taken to guarantee the necessary stability.

It is an object of the invention to propose an air outlet device of the type mentioned at the outset, in which the closure flap requires only a small amount of free space in the open and closed positions and the number of components required is reduced.

The above object is achieved according to the invention in an air outlet device of the type mentioned at the outset because, in cross-section, the closure flap is of circular ring segment-shaped (part-circular) design, because the pivot axis of the closure flap lies in the center point of the circular ring segment shape and because the actuating part is arranged on the closure flap.

In its open position, the closure flap in this air outlet device is not tilted into the free space in front of or behind the air passage opening but is pivoted along the edge of the free space. The free space in front of the air outlet opening is thus available for installing an air guide louver. As a result, the constructional depth of the housing body can be small.

Since the actuating part is arranged directly on the closure flap, it is not necessary to provide the closure flap and the actuating part in each case with their own bearing points. Moreover, components for transmitting the movement of the actuating part to the closure flap are unnecessary. The expense in terms of construction and assembly is thereby considerably reduced.

Another advantageous feature is that the closure flap cannot be displaced out of the open position or out of the closed position by the flow of air. In the open position, the flap is situated outside the cross-section of the air passage opening. Accordingly, it is not acted upon by the air flowing through.

Advantageous embodiments of the invention emerge from the subclaims and the following description of an exemplary embodiment.

In the drawings:

FIG. 1 shows an air outlet device in elevation along the line I—I according to FIG. 2A, FIG. 2A shows a section along the line II—II according to FIG. 1.

FIG. 2B shows the air guide louver which can be attached to the housing body of FIG. 2A.

FIGS. 1 to 3 illustrate a motor vehicle air outlet device without the air guide louver which can be inserted into it.

Figure 3:
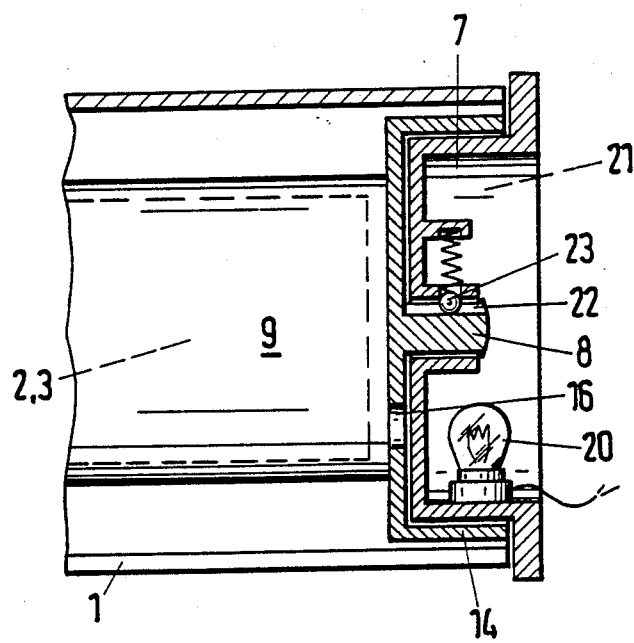
FIG. 3 shows a section through the side with the actuating part along the line III—III according to FIG. 2A.

A housing body (1) forms an air inlet shaft (2) having an air passage opening (3) and an air exit shaft (4). A bearing journal (6) is provided at one side wall (5) of the housing body (1). A second bearing journal (8) is formed at a removable side wall part (7) opposite side wall (5).

The bearing journals (6, 8) form the pivot axis for a closure flap (9). This is circular ring segment-shaped in cross-section, i.e., partly cylindrical (cf. FIG. 2). The center point of the radius of this part-circular shape coincides with the pivot axis. The edge (10) of the air passage opening (3), which edge surrounds the air passage opening (3), is matched to the shape of the closure flap (9) in a manner such that, in the closed position shown in the figures, the latter closes the air passage opening (3) as tightly as possible and fits over the edge (10).

On the inner side (11) of its wall (12), the air exit shaft (4) is partly cylindrical in shape, corresponding to the radius of the closure flap (9).

An arm (13), which is mounted on the bearing journal (6), is formed on the closure flap (9). A wheel-shaped actuating part (14) (which may include a lever-shaped design (25)), whose radius is equal to the radius of the closure flap (9) and which is situated in the air exit shaft (4) and is mounted on the bearing journal (8), is furthermore formed on the closure flap (9).

A portion (19) of the actuating part (14) projects beyond the housing body (1).

As well as bearing journal (8), an additional journal (15) is formed at side wall part (7). This journal passes through a circular arc-shaped slot (16) in the actuating part (14). In this arrangement, this forms a stop for the adjustment of the actuating part (14) and thus at the same time for the closed position and the open position of the closure flap (9). A stop of this kind can also be created by appropriate shaping of the inner side (11) of the wall (12), for example by means of a molded-on piece (24). In FIG. 2, the open position of the closure flap (9) is shown in broken lines.

An additional journal (17) corresponding to journal (15) is provided at side wall (5). The journals (15, 17) serve to mount the air guide louver (26) which is inserted into the air exit shaft (4).

The closure flap (9), the arm (13) and the actuating part (14) are formed by a one-piece plastics molding. Together with the housing body (1) and the side wall part (7) of the latter, the air outlet device—apart from the air guide louver—is composed of only three moldings.

The actuating part (14) is hollow. The actuating part (14) can be illuminated from inside by means of a lamp (20) arranged at the side wall part (7). Openings (18) are provided on the actuating side in order to make the position of the closure flap (9) recognizable in an illuminated manner. If the bearing journal (8) is fixed to the actuating part (14) rather than to the side wall part (7) (cf. FIG. 3), then it is extended into the cavity (21) of the actuating part (14). Longitudinal grooves (22) corresponding to the closed position and the open position of the closure flap (9) are provided on the bearing journal (8). A spring-loaded locking element (23) is arranged on the side wall part (7), locking in one or other groove (22). A locking facility is thereby formed for the closed position and the open position of the closure flap (9).

In the closed position of the closure flap (9), as shown in the figures, the air passage opening (3) is tightly closed. Flow pressure acting on the closure flap (9) does not have the tendency to displace the closure flap (9) out of its closed position since, in its projection, the pivot axis formed by the bearing journals (6, 8) is centrally positioned between the longitudinal edges of the air passage opening (3).

When the closure flap (9) is opened by means of the actuating part (14), the closure flap (9) pivots into the position shown in FIG. 2 in broken lines. During this operation, it is displaced in a frictionless manner along the inner side (11). Since only two bearing points are provided, the movement of the closure flap (9) is smooth. Towards the end of the opening movement, the locking element (23) locks and secures the end position. In the open position, the closure flap (9) takes up hardly any space in the air outlet shaft (4) since it lies close to the inner side (11). The air passage opening (3) is free over its entire cross-section. The air passing through does not have the tendency to displace the closure flap (9) out of its open position.

From the one position into the other position, the actuating part (14) is displaced in about 90°. Accordingly, the circular ring segment shape of the closure flap (9) extends in a position pivoted by about 90°. In order to achieve reliable covering of the edge (10) in the closed position, the edge (10) is designed tighter than 90° relative to the pivot axis. The radius of the closure flap (9) is chosen in accordance with the desired radius of the wheel-shaped actuating part (14). If necessary, the radius of the actuating part (14) can also be greater than the radius of the closure flap (9).

What is claimed is:

1. An air outlet device for a vehicle passenger compartment ventilation system, comprising:
    a housing body having an air passage opening and first and second opposing sidewalls;
    a closure flap of part-circular cross-section pivotably mounted on the housing to be tiltable about a pivot axis located downstream from the air passage opening, the pivot axis corresponding to the center of curvature of the closure flap;
    an actuating part arranged on the closure flap and pivotably mounted on the first sidewall so as to pivot about the pivot axis, said actuating part being wheel-shaped and having a slot formed therein, wherein the closure flap is in part pivotably mounted on the housing body through said pivotable mounting of the actuating part;
    a mounting arm arranged on said closure flap and pivotably mounted on said second sidewall, wherein said closure flap, said actuating part, and said mounting arm are formed as a one-piece molding;
    a first journal formed on said first sidewall which extends through the slot formed in the actuating part, said slot having ends which form stops for movement of the closure flap;
    a second journal formed on said second sidewall; and
    an air guide louver mounted on the first and second journals.

2. The air outlet device of claim 1, wherein the housing body is provided with an air exit passage having a part-cylindrical inner surface of a radius corresponding to the radius of the closure flap.

3. An air outlet device for a vehicle passenger compartment ventilation system, comprising:
    a housing body having an air passage opening and first and second opposing sidewalls;
    a closure flap of part-circular cross-section pivotably mounted on the housing to be tiltable about a pivot axis located downstream from the closure flap, the pivot axis corresponding to the center of curvature of the closure flap;
    an actuating part arranged on the closure flap and mounted on the first sidewall so as to pivot about the pivot axis, said actuating part having a slot formed therein;
    a first journal formed on said first sidewall which extends through the slot formed in the actuating part, said slot having ends which form stops for movement of the closure flap;
    a second journal formed on said second sidewall; and
    an air guide louver mounted on the first and second journals.

4. The air outlet device of claim 3, wherein the actuating part is of wheel or lever-shaped design and has the same radius as the closure flap.

5. The air outlet device of claim 3, wherein the actuating part is pivotably mounted on the housing body, the closure flap being in part pivotably mounted in the housing body through said pivotable mounting of the actuating part.

6. The air outlet device as claimed in claim 3, further comprising a mounting arm arranged on said closure flap and pivotably mounted on said second sidewall, wherein said closure flap, said actuating part, and said mounting arm are formed as a one-piece molding.

7. The air outlet device as claimed in claim 3, wherein the housing body is provided with an air exit passage having a part-cylindrical inner surface of a radius corresponding to the radius of the closure flap.

* * * * *